A. N. JEAVONS.
CASING FOR VEHICLE SPRINGS.
APPLICATION FILED FEB. 27, 1914.
1,135,186. Patented Apr. 13, 1915.
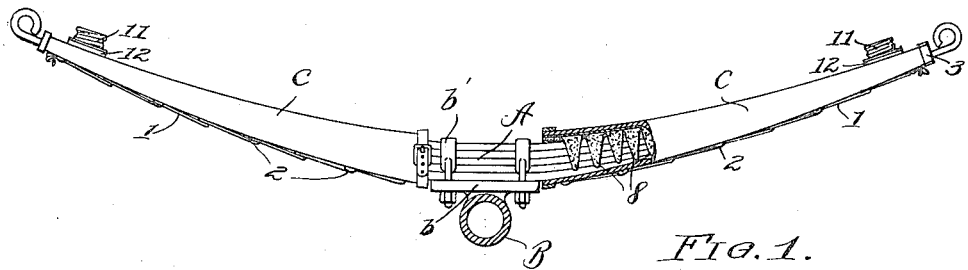
Fig. 1.
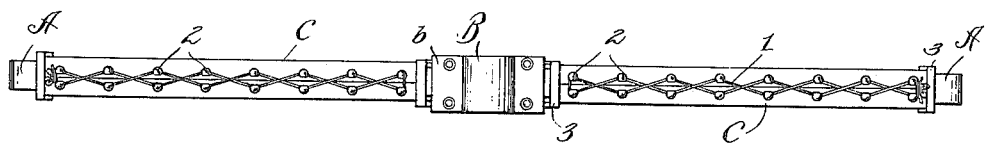
Fig. 2.
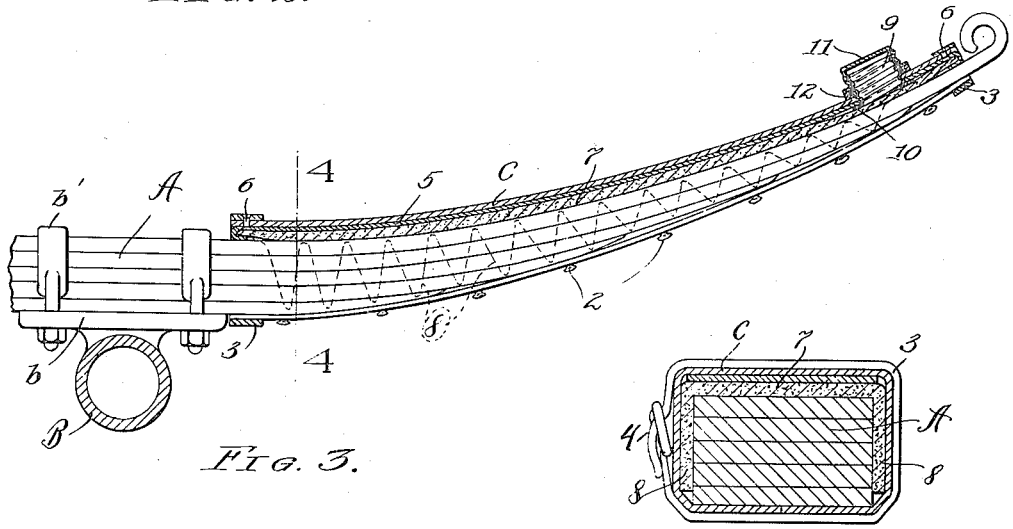
Fig. 3. Fig. 4. Fig. 5.
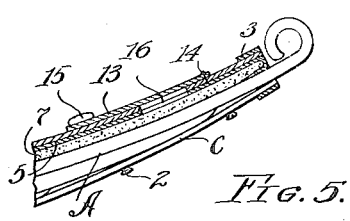
Witnesses:
R. L. Bruck.
H. B. McGill.
Inventor,
Albert N. Jeavons
By Hull and Smith
Attys.

UNITED STATES PATENT OFFICE.

ALBERT N. JEAVONS, OF CLEVELAND, OHIO.

CASING FOR VEHICLE-SPRINGS.

1,135,186.　　　Specification of Letters Patent.　　Patented Apr. 13, 1915.

Application filed February 27, 1914.　Serial No. 821,374.

*To all whom it may concern:*

Be it known that I, ALBERT N. JEAVONS, a citizen of the United States, residing at Cleveland, in the county of Cuyahoga and State of Ohio, have invented a certain new and useful Improvement in Casings for Vehicle-Springs, of which the following is a full, clear, and exact description, reference being had to the accompanying drawings.

This invention relates to casings or covers for vehicle springs, and it has for its objects to provide a spring casing or cover which may be quickly and easily applied to springs of various shapes, or of varying degrees of curvature; which will protect the spring to which it is applied against dirt or grit; and which will, at the same time, serve as a means for delivering to the springs, a lubricant, and of distributing the lubricant evenly throughout the length of the spring, whereby the spring may be very effectively oiled and thereby very materially increase its efficiency.

I am aware that casings have been produced heretofore for the purpose of protecting vehicle springs, and that various means have been employed of lubricating springs; but my invention consists of certain novel features which are present in the construction of my improved spring casing, and of a combination between such casing and means for introducing a lubricant into the casing and distributing it evenly throughout that portion of the spring covered by the casing; and of providing, furthermore, a reservoir wherein a quantity of lubricant may be contained for distribution.

More generally stated, my invention consists of the combinations of elements set forth in the annexed claims and illustrated in the accompanying drawing, which forms a part hereof, wherein—

Figure 1 is a side elevation of a vehicle spring of the semi-elliptical type, mounted upon a vehicle axle, and equipped with a pair of my improved spring casings; Fig. 2 is a bottom plan view of what is shown in Fig. 1; Fig. 3 is a side elevation of one end of the spring shown in the preceding figures, and a central, longitudinal section through the casing which is applied thereto; Fig. 4 is an enlarged transverse section on line 4—4 of Fig. 3; and Fig. 5 shows a modified form of the means whereby a lubricant may be introduced into the casing.

In the drawing A represents a vehicle spring which, as above stated, is of the semi-elliptical type. The spring A is secured, in the usual manner, to the spring pad $b$ of the vehicle axle B, by the clips $b'$. Applied to each end of the spring is one of my improved casings which is designated generally by C.

Each of the casings is constructed of flexible material, such as leather, oil cloth, a heavy quality of canvas, or the like, and is made to conform to the shape of the spring. The casing is preferably made to fit across the top of the spring, down each side thereof and slightly overlap beneath the spring where the adjacent edges are drawn and held together by a lace 1 which engages a series of hooks 2 (similar to the hooks which are used on shoes), one series being located along each edge of the casing. A strap 3 is attached to each end of the casing, and is adapted to be drawn tightly about the spring and held by a buckle 4.

On account of the taper of the spring from its center toward its ends, and due to the vibration of the spring, the inner end of the casing would be liable to work toward the outer end of the spring, thereby causing the casing to become wrinkled and loose, if it were not for the provision of a stay 5 which is substantially coextensive with that portion of the casing which extends across the top of the spring. This stay may be made of any suitable, stiff material, it being preferably constructed of thin sheet metal, and it is secured to the spring casing in any approved manner, as by rivets 6 which pass through the ends of the stay, the ends of the casing, and the straps 3 which pass therearound.

Contained within the casing, between the stay 5 and the top leaf of the spring, is a pad 7 of absorbent material. This may or may not be secured to the casing as desired, but I prefer to attach it to the casing by turning the ends of the stay 5 downwardly and inwardly under the adjacent ends of the pad. By this means the pad will be securely held against displacement. Depending from each edge of the pad are a plurality of tabs 8 which are preferably formed integral therewith. From this construction, it will be seen that, if the pad 7 be saturated with a lubricant, the lubricant will, by capillary attraction, become distributed throughout the length of the pad and will travel downwardly through the tabs 8 to very effectively oil every part of the spring. It will be noted that, because of the tapered shape of the tabs 8, they will readily adjust themselves to varying degrees of curvature resulting either from the variation in the actual shapes of different springs, or from the vibration of the spring to which the casing is applied.

As a means of supplying lubricant to the pad 7 I employ a threaded thimble 9 which passes through openings in the casing and in the stay 5 and is retained therein by an outwardly projecting annular flange 10. Because of its function, this thimble will be referred to hereinafter, as the lubricant cup. This cup is provided with a screw cap 11, between the flanged, inner end of which and the adjacent portion of the casing, there is interposed a gasket 12. The cup may be filled with a lubricant and the cap firmly set up against the gasket 12, when the cup will fulfil the function of a reservoir and retain a quantity of lubricant which will gradually be distributed throughout the pad. By using a comparatively heavy oil, the distribution of the oil will be slow and the lubrication very effective.

In Fig. 5 I have illustrated another means through which oil may be supplied to the pad 7, which means comprises a flap 13 of the same or similar material to that from which the casing is made, and which is stitched at 14 to the casing. At 15, the flap is provided with fasteners, such as glove buttons, and beneath the flap, the casing and the stay 5 are provided with apertures as shown at 16. While this modification is neat in appearance and convenient of use, it lacks that advantage possessed by the former type, of providing a reservoir for the lubricant.

My casings are shown as covering all but the central portion of the spring, or that part which is occupied by and intermediate the clips $b'$; and, while it is deemed unnecessary to cover this portion of the spring because of the fact that there is no play between the leaves of the spring in this region, it will be understood that the coverings C may be joined at their inner ends, if desired, by a sheathing which will inclose the central portion of the spring; and, furthermore, while I have described my casing as being removably applied to the spring, it is obvious that the same may be permanently attached thereto in any approved manner, as by riveting the adjacent edges of the cover together beneath the spring.

Having thus described my invention, what I claim is:—

1. The combination, with a casing for vehicle springs comprising a flexible member conforming in configuration with the spring and adapted to be fitted thereto, and a stay for holding said member extended in the direction of the length of the spring, of a pad of absorbent material which is substantially coextensive with said stay and which is secured thereto, the casing and the stay having alining openings through which a lubricant may be applied to said pad, and a cover for said openings.

2. The combination, with a casing for vehicle springs comprising a flexible member conforming in configuration with the spring and adapted to be fitted thereto, of a pad of absorbent material within said casing which is arranged to rest upon the upper surface of the spring and having extensions which contact with the sides of the spring.

3. The combination, with a casing for vehicle springs comprising a flexible member conforming in configuration with the spring and adapted to be fitted thereto, and a stay for holding said member extended in the direction of the length of the spring, of a pad of absorbent material which is substantially coextensive with said stay and which is adapted to be secured thereto by having its ends embraced by the turned over ends of said stay, the stay and the casing having alining openings through which a lubricant may be applied to the pad, and a cover for said openings.

4. The combination, with a casing for vehicle springs comprising a flexible member conforming in configuration with the spring and adapted to be fitted thereto, and a stay for holding said member extended in the direction of the length of the spring, of a pad of absorbent material within the casing, the casing and the pad having alining openings, a thimble extending through said openings and having an annular flange which is adapted to engage the stay adjacent its opening, and a cap for said thimble.

In testimony whereof, I hereunto affix my signature in the presence of two witnesses.

ALBERT N. JEAVONS.

Witnesses:
BRENNAN B. WEST,
HUGH B. McGILL.